United States Patent [19]

Degel et al.

[11] Patent Number: 4,491,609

[45] Date of Patent: Jan. 1, 1985

[54] METHOD OF MANUFACTURING ADSORBENTS

[75] Inventors: Josef Degel, Hattingen; Klaus-Dirk Henning; Jürgen Klein, both of Essen; Klaus Wybrands, Bochum, all of Fed. Rep. of Germany

[73] Assignee: Bergwerksverband GmbH, Essen, Fed. Rep. of Germany

[21] Appl. No.: 520,003

[22] Filed: Aug. 3, 1983

[30] Foreign Application Priority Data

Aug. 6, 1982 [DE] Fed. Rep. of Germany ....... 3229396

[51] Int. Cl.$^3$ .......................... B05D 7/00; B01D 39/00
[52] U.S. Cl. .................................... 427/215; 502/416; 502/417; 55/72; 55/387
[58] Field of Search .................. 502/416, 417; 55/387, 55/72; 427/215

[56] References Cited

U.S. PATENT DOCUMENTS 3,876,393 4/1975 Kasai et al. ............................. 55/72
3,956,458 5/1976 Anderson ................................ 55/72

Primary Examiner—John E. Kittle
Assistant Examiner—James J. Seidleck
Attorney, Agent, or Firm—Michael J. Striker

[57] ABSTRACT

A carbonaceous adsorbent impreganted with elementary sulfur is produced by mixing the adsorbent with elementary sulfur in a quantity required for the desired impregnation, heating the mixture to a temperature between 120° and 300° C., maintaining this temperature over a time period of between 1 and 40 hours, and then cooling the mixture.

6 Claims, No Drawings

METHOD OF MANUFACTURING ADSORBENTS

BACKGROUND OF THE INVENTION

The present invention relates to a method of manufacturing adsorbents. More particularly, it relates to a method of manufacturing carbonaceous adsorbents impregnated with elementary sulfur.

For removing harmful or even poisonous material, such as quick silver, from waste gases, for example from surrounding air in laboratories operating with quick silver, it is known to use as a rule activated coal impregnated with materials which bind quick silver. In particular, activated coal impregnated with elementary iodine is used for this purpose. Such activated coal is obtained by impregnating of it with sulfuric acid and potassium iodide. Moreover, it is known that activated coal impregnated with elementary sulfur is especially suitable for removing quick silver vapors from air or other gases, as disclosed for example in "Chemical Engineering Progress" Vol. 70 (1974), page 45.

As a rule, the manufacture of impregnated activated coal is carried out by a soaking process in which the desired content of the material to be provided is adjusted by concentration of the soaking solution and the number of the soaking steps. It is possible in this manner to provide in general not more than 10-12 weight % of the desired material. Metallic materials can be put in immediately prior to or during the activating treatment of the coal.

Forcing-in of elementary sulfur during the activated coal manufacture is, however, not possible since the sulfur evaporates at the temperatures of the activation of 800°-900° C., or when it has not been evaporated it is converted during the water vapor activation into hydrogen sulfide.

With the utilization of the soaking process for charging with elementary sulfur, the sulfur must be dissolved in a suitable solvent, soaked with the activated coal, and subsequently again vaporized. There are suitable solvents for this purpose, but this is connected in all soaking processes with serious disadvantages.

Elementary sulfur dissolves for example in an ammonium polysulfide solution or in an organic solvent, such as carbon disulfide, benzene, toluene and alcohols. A soaking with a polysulfide solution is excluded on the grounds of environmental protection, since considerable waste air and waste water problems occur. In the event of soaking with sulfur dissolved in organic solvents, the solvent must be again vaporized after the soaking. Since activated coal adsorbs in addition to the sulfur simultaneously 50-100 weight % of the solvent, considerable quantities of heat are required for desorption and removal of the solvent. Moreover, for putting in of 20-30 weight % of sulfur, at least 2-3 soaking steps are required.

A further possibility of putting in of sulfur to an activated coal is provided by a catalytic $H_2S$ oxidation of $H_2S$-containing gases in a reactor accommodating an activated coal. Such a method is, however, very expensive and does not produce uniform sulfur loading on the activated coal. The same disadvantages are encountered when sulfur is separated from a sulfur-containing gas stream flowing through activated coal, directly by adsorption. As required by the low vapor pressure of the sulfur (at 200° C. only 0.02 kg $S/m^3$ gas), such a method can be carried out at temperatures of above 200° C.

SUMMARY OF THE INVENTION

Accordingly, it is an object of the present invention to provide a method of producing carbonaceous adsorbents impregnated with elementary sulfur which avoids the disadvantages of the prior art.

More particularly it is an object of the present invention to provide a method of manufacturing carbonaceous adsorbents impregnated with elementary sulfur, which simplifies the impregnation of carbonaceous adsorbent with a desired sulfur content and the adsorbent is produced with a uniform impregnation with elementary sulfur.

In keeping with these objects, and with others which will become apparent hereinafter, one feature of the present invention resides, briefly stated, in a method of manufacturing of a carbonaceous adsorbent impregnated with elementary sulfur, in accordance with which carbonaceous adsorbent is mixed with elementary sulfur, heated in immovable or movable pile to temperature of between 120° and 300° C., this temperature is maintained for a time period of between 1 and 40 hours, and after this the mixture is cooled.

When the method is performed in accordance with the present invention, the above mentioned objects are attained.

The novel features which are considered characteristic for the invention are set forth in particular in the appended claims. The invention itself, however, both as to its construction, method of manufacture, and the produced results, together with additional objects and advantages thereof, will be best understood from the following description of the specific embodiments.

DESCRIPTION OF THE PREFERRED EMBODIMENTS

In accordance with the present invention, for manufacturing carbonaceous adsorbent impregnated with elementary sulfur, a carbonaceous adsorbent is mixed with elementary sulfur, heated in stationary or movable pile to a temperature between 120° and 300° C., this temperature is maintained for a time period of between 1 and 40 hours, and then the mixture is cooled.

It has been found that in a surprisingly simple manner carbonaceous adsorbents can be uniformly impregnated with elementary sulfur. These results are unexpected, since the vapor pressure of sulfur in condition of an average working temperature of approximately 150° C. accounts to only approximately 0.002 kg $S/m^3$.

Good results are produced in the inventive method regardless of the type of carbonaceous adsorbent, for example whether it is activated coal or activated coke, and regardless of the grain size, mixing ratio and operational temperatures or operating times. A pressure adjusted in a closed reactor during the thermal treatment does not have any influence on the process. It is, however, recommended to carry out the impregnation in a closed pressure container on the grounds of environmental protection. The carbonaceous adsorbent can, for example, have a BET surface in accordance with German Standard DIN No. 66131 of 40-1300 $m^2/g$ with a macropore volume of 20-80 $cm^3/100$ g (measured with quick silver pore symmetry) and a micropore volume of 2-65 $cm^3/100$ g (measured with benzene adsorption isotherms). Especially suitable are activated coals with these properties. They can be produced, for example, from wood, turf or manual coal. Also, coke can be impregnated with sulfur in accordance with the inventive method.

The mixing ratio of the carbonaceous adsorbent and elementary sulfur can vary within wide limits. For example, it can be equal to between 1:0.02 and 1:0.55. This makes possible to obtain a sulfur content of the adsorbent of approximately 2–35 weight %.

The grain size of the carbonaceous adsorbent can vary between pulverulent to briquettes of approximately 4 mm. Also a granulate of between 1 and 4 mm is suitable for the impregnation. The grain size and grain distribution has no influence on the results of the impregnation.

The time period of the thermal treatment can amount to between 1 and 40 hours, and the thermal treatment can be carried out at temperatures between 120° and 300° C.

The carbonaceous adsorbent impregnated with elementary sulfur does not differ from the non-treated adsorbent as seen from outside. Experiments have shown that elementary sulfur is adsorbed exclusively on the inner surface of the adsorbent.

The thermal treatment of the mixture of carbonaceous adsorbent with elementary sulfur can be carried out in reactors of any type. For example, both stationary bed as well as traveling bed and fluidized bed reactors can be utilized. Also, the thermal treatment can be performed in revolving tubular furnaces.

With the inventive method, which is illustrated by the following examples, a carbonaceous adsorbent, particularly activated coal can be impregnated in a surprising and simple manner completely uniformly with exactly fixed quantities of elementary sulfur. An especial advantage of the method is the low energy consumption and complete avoidance of environmental problems during the impregnation. Moreover, it is possible to bring in the carbonaceous adsorbents under the conditions of the inventive method also other materials, either elements or compounds.

Initial materials for the impregnated adsorbent produced in the following examples are:

| No. | Name | starting material | grain size [mm] | pore volume [cm$^3$/100 g] <10 nm | pore volume [cm$^3$/100 g] >10 nm | BET-surface [m$^2$/g] |
|---|---|---|---|---|---|---|
| 1 | activated coal | mineral coal | 3 mm briquette | 40 | 41 | 1,000 |
| 2 | activated coal | mineral coal | 4 mm briquette | 65 | 76 | 1.290 |
| 3 | activated coal | wood | <100 μm powder | 21 | — | 514 |
| 4 | activated coal | turf | 3 mm briquette | 54 | 48 | 1,130 |
| 5 | activated coal | mineral coal | 1–3 mm granulate | 2 | 20 | 40 |

EXAMPLE 1

2.35 kg of activated coal No. 1 is mixed with 0.8 kg of sulfur and is kept in a 10 liter autoclave for 10 hours at 200° C. The pressure in the autoclave increases to 4 bar. After 10 hours it is cooled and the activated coal is removed from the autoclave. The activated coal does not show on the outer surface any sulfur residues. Sulfur determination in probes which are taken at horizontally and vertically spaced locations show a homogeneous sulfur distribution of 24–26% of sulfur.

EXAMPLE 2

2.35 kg of the activated coal No. 2 is mixed with 1.2 kg of sulfur and retained in a 10 liter autoclave at 130° C. for 40 hours. In contrast to Example 1, the valve of the autoclave is open in the heating phase, so that the gas is desorbed by the activated coal can escape. No further pressure increase is measured. In this case the sulfur is distributed completely homogeneously on the inner surface of the activated coal, and the sulfur content of 32–34 weight % is obtained.

EXAMPLE 3

2.35 kg of activated coal No. 3 is mixed, as described in Example 2, with 0.26 kg of sulfur and further treated. In this case also, a product with a homogeneously distributed sulfur content of 9–10 weight % is obtained.

EXAMPLE 4

15.5 kg of activated coal No. 4 is mixed with 4.4 kg of sulfur in a revolving tubular furnace and heated during 1 hour to 270° C. A uniform product with a sulfur content of 21 weight % is obtained.

EXAMPLE 5

21 kg of activated coke No. 5 is mixed with 1 kg of sulfur in a revolving tubular furnace and heated to 220° C. and maintained at this temperature for 3 hours. In differently taken probes the sulfur content of 4–5 weight % is obtained.

It will be understood that each of the elements described above, or two or more together, may find a useful application in other types of examples differing from the types described above.

While the invention has been illustrated and described as embodied in a method of manufacturing carbonaceous adsorbents impregnated with elementary sulfur, it is not intended to be limited to the details shown, since various modifications and structural changes may be made without departing in any way from the spirit of the present invention.

Without further analysis, the foregoing will so fully reveal the gist of the present invention that other can, by applying current knowledge, readily adapt it for various applications without omitting features that, from the standpoint of prior art, fairly constitute essential characteristics of the generic or specific aspects of this invention.

We claim:

1. A method of manufacturing a carbonaceous adsorbent impregnated with elementary sulfur, comprising the steps of:
   mixing a carbonaceous adsorbent with elementary sulfur;
   heating the thus obtained mixture to a temperature of 120°–300° C.;
   maintaining this temperature for a time period of 1–40 hours; and
   cooling the mixture, so that the elementary sulfur impregnated carbonaceous adsorbent produced is uniformaly distributed with a fixed quantity of elementary sulfur adsorbed exclusively into the inner surface of the carbonaceous adsorbent instead of distributed over the outer surface of the carbonaceous adsorbent.

2. A method as defined in claim 1, wherein said heating step includes heating of the mixture of the carbonaceous adsorbent with elementary sulfur in stationary pile.

3. A method as defined in claim 1, wherein said step of heating the mixture of carbonaceous adsorbent with elementary sulfur includes heating the mixture in a movable pile.

4. A method as defined in claim 1, wherein said mixing step includes mixing the adsorbent with elementary sulfur in a mixing ratio of between 1:0.02 and 1:0.55.

5. A method as defined in claim 1, wherein said mixing step includes using the adsorbent which has a BET surface of between 40 and 1,300 $m^2/g$ and a macropore volume of between 20 and 80 $cm^3/100$ g.

6. A method as defined in claim 1, wherein said heating and maintaining step includes thermally treating the mixture under pressure.

* * * * *